(12) United States Patent
Yousseff

(10) Patent No.: US 6,400,709 B1
(45) Date of Patent: Jun. 4, 2002

(54) DTMF DETECTION IN INTERNET TELEPHONY

(75) Inventor: Khalid Yousseff, Jersey City, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/204,607

(22) Filed: Dec. 2, 1998

(51) Int. Cl.$^7$ ................................................ H04L 12/56
(52) U.S. Cl. ...................... 370/352; 370/401; 370/526; 379/88.18
(58) Field of Search .................. 370/352, 353, 370/354, 355, 356, 392, 401, 525, 526; 379/77, 80, 87, 88.01, 88.03, 88.07, 88.17, 88.18, 88.23, 88.24, 93.01, 93.08, 93.28, 93.29, 93.31, 281, 282, 283, 284, 287, 386

(56) References Cited

U.S. PATENT DOCUMENTS

| | | | |
|---|---|---|---|
| 5,949,874 A | * 9/1999 | Mark | 379/283 |
| 6,226,303 B1 | * 5/2001 | Levens et al. | 370/526 |
| 6,259,691 B1 | * 7/2001 | Naudus | 370/352 |

\* cited by examiner

*Primary Examiner*—Chau Nguyen
*Assistant Examiner*—Duc Duong
(74) *Attorney, Agent, or Firm*—Kaplan & Gilman, LLP

(57) ABSTRACT

A method of transmitting DTMF tones over an Internet telephone call includes the step of monitoring an audio signal in a transmitting IP Gateway in order to determine when tone is suspected, and then deleting the audio signal including such tone if tone is confirmed. After the audio signal including the tone is deleted, a digital out of band signal is transmitted including the appropriate tone information.

7 Claims, 2 Drawing Sheets

DTMF DETECTION IN INTERNET TELEPHONY

TECHNICAL FIELD

This invention relates to Internet telephony, and more specifically, to an improved technique of accurately transmitting dual tone multi-frequency (DTMF) tones reliably and with minimum overhead over a data network such as the Internet.

BACKGROUND OF THE INVENTION

Internet telephony is a rapidly growing field and is expected to continue growing. Internet telephony involves the transmission of telephone traffic over a data network. The use of a data network, and the transmission of the telephone call using packet switching techniques rather than circuit switching techniques as in conventional telephony, allows a variety of value added services to be implemented. Additionally, use of the Internet results in a much less costly telephone call, since data traffic over the Internet is virtually free.

Typically, two audio terminals communicate by each establishing a local circuit switched connection to a local Internet gateway. The gateways then communicate with each other over the Internet using the standardized Internet protocol (IP) and well-known packet switching techniques. Thus, a long distance call may be implemented using two local telephone calls and a long distance Internet connection.

The transmission of voice and other audio traffic over the Internet is done using digitization and encoding techniques. Specifically, the International Telecommunications Unit (ITU) has defined a G.723 standard for transmission of voice over the Internet. The standard specifies the particular mathematical encoding algorithm that is utilized in order to compress and encode the digital voice for packet transmission over the Internet.

Unfortunately, the particular mathematical encoding algorithm does not accurately and efficiently encode signals which represent DTMF tones. Moreover, since a DTMF tone is simply an analog signal representative of a digit pressed, there is no need to transmit the entire analog signal over the digital data network. Rather, the DTMF digit may be transmitted as digital data over the Internet.

The ITU standard for Internet telephony specifies that the digital data is to be transmitted out of band, i.e., as a digital signal separate from the encoded audio signal. There appears to be no efficient standard method for transmitting DTMF tones and for minimizing the latency, overhead and errors associated therewith.

In view of the above, there exists a need in the art for an improved and efficient method of transmitting DTMF tones from an Internet telephony gateway, over the Internet to a receiving Internet telephony gateway. Additionally, the technique should minimize the additional overhead associated with transmission of the DTMF tones.

SUMMARY OF THE INVENTION

The above and other problems in the prior art are overcome and a technical advance is achieved in accordance with the present invention which relates to a DTMF detector installed in parallel with a voice coder running at the Internet telephony transmitting gateway. In accordance with the invention, a very fast algorithm is used (e.g., 10 milliseconds detecting time) to determine whether or not a tone is suspected in the data stream being transmitted. If such a tone is suspected, then transmission is held up for several frames until a tone is confirmed. If, prior to the expiration of the several frame period, a "kill" signal is received, then it is determined that the audio stream did not include a DTMF.

If the foregoing decision indicates that a DTMF tone is present, the actual digitized audio reflecting the DTMF signal is discarded, and a digital signal is sent, out of band, indicating to a receiving gateway that the DTMF tone has been depressed. If, on the other hand, the algorithm at the transmitting gateway indicates that a DTMF tone has not been depressed, and that the suspected DTMF tone was actually a small portion of the audio signal that was simulating a DTMF tone, then the audio signal suspected of being a tone is transmitted. Any delay introduced to the audio signal by the suspecting of tone and the later finding out that the tone was not actually present in the audio signal is compensated for by deleting later arriving portions of the audio signal which are determined to contain silence.

In another embodiment, the DTMF detector uses as its input the LPC filter present in the voice coder. This has two advantages. First, since the LPC encoding is being done as part of normal speech encoding, no additional overhead is introduced. Second, the FFT utilized to detect the DTMF frequencies operates on the LPC coefficients, rather than on raw digital data. Therefore, the DTMF tones can be detected with a relatively short FFT.

DETAILED DESCRIPTION OF THE PREFERRED EMBODIMENT

Figure 1:
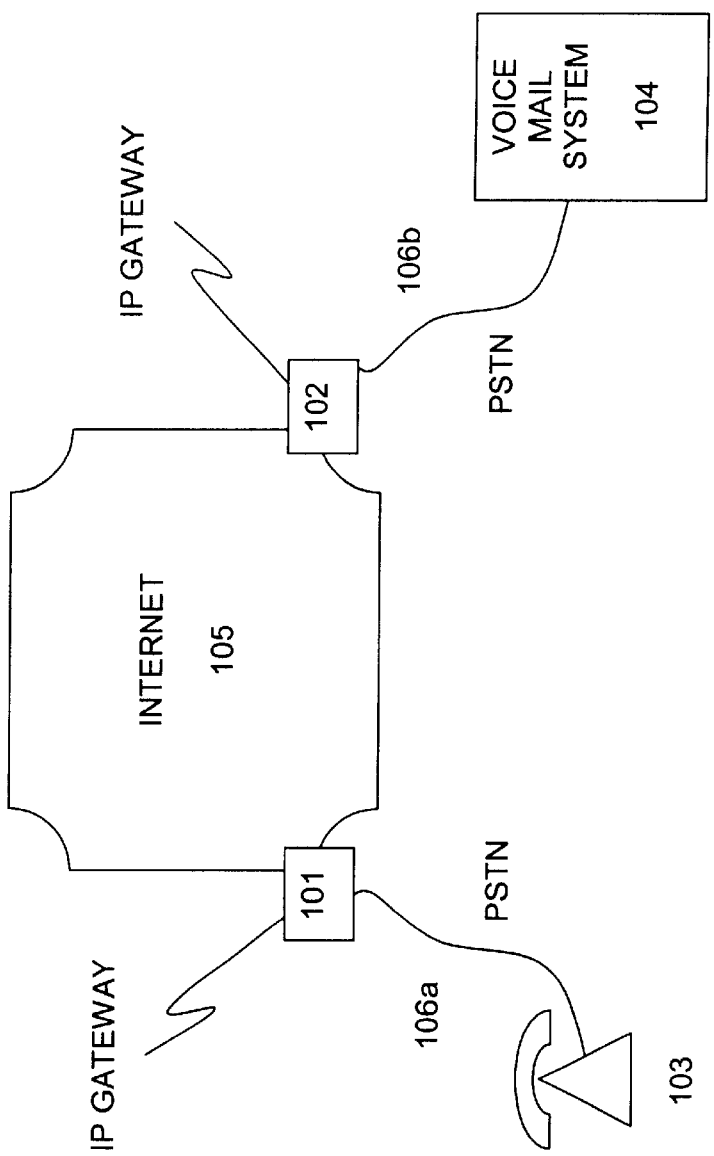
FIG. 1 shows a high level conceptual block diagram of an Internet telephony arrangement.

FIG. 1 shows an Internet telephony arrangement including a voice processing system 104 and a remote telephone station 103. The voice processing system 104 and telephone station 103 communicate utilizing two conventional circuit switched telephone connections 106a and 106b, and two IP gateways 101 and 102. For purposes of explanation herein, we will term IP gateway 101 the transmitting gateway, and IP gateway 102 the receiving gateway.

IP gateways 101 and 102 communicate over the IP network 105 using the conventional internet protocol which is well-defined. The physical and logical structure of IP network 105 is also defined in the prior art and thus, will not be described in further detail herein.

In operation, a user desiring to access information or other services resident on voice processing system 104 dials the telephone number of voice processing system 104 and awaits a connection. Telephone 103 forms a circuit switched connection with transmitting gateway 101 in a conventional manner. The transmitting gateway 101 determines which one of the numerous other gateways connected to the IP network 105 is the proper gateway for communicating with voice processing system 104. Such determination is made using standard table look-ups in accordance with known techniques.

Upon receipt of the request to set up a telephone call by receiving gateway 102, a conventional circuit switched connection is established from gateway 102 to voice processing system 104 over circuit switched connection 106b in accordance with standard and conventional telephony techniques.

After the call has been set-up, audio signals may then be transmitted to and from voice processing system 104 from telephone 103 over circuit switched connections 106a and 106b, and Internet 105. The audio signals may include voice and DTMF ones, as well as signals representative of facsimile images.

Figure 2:
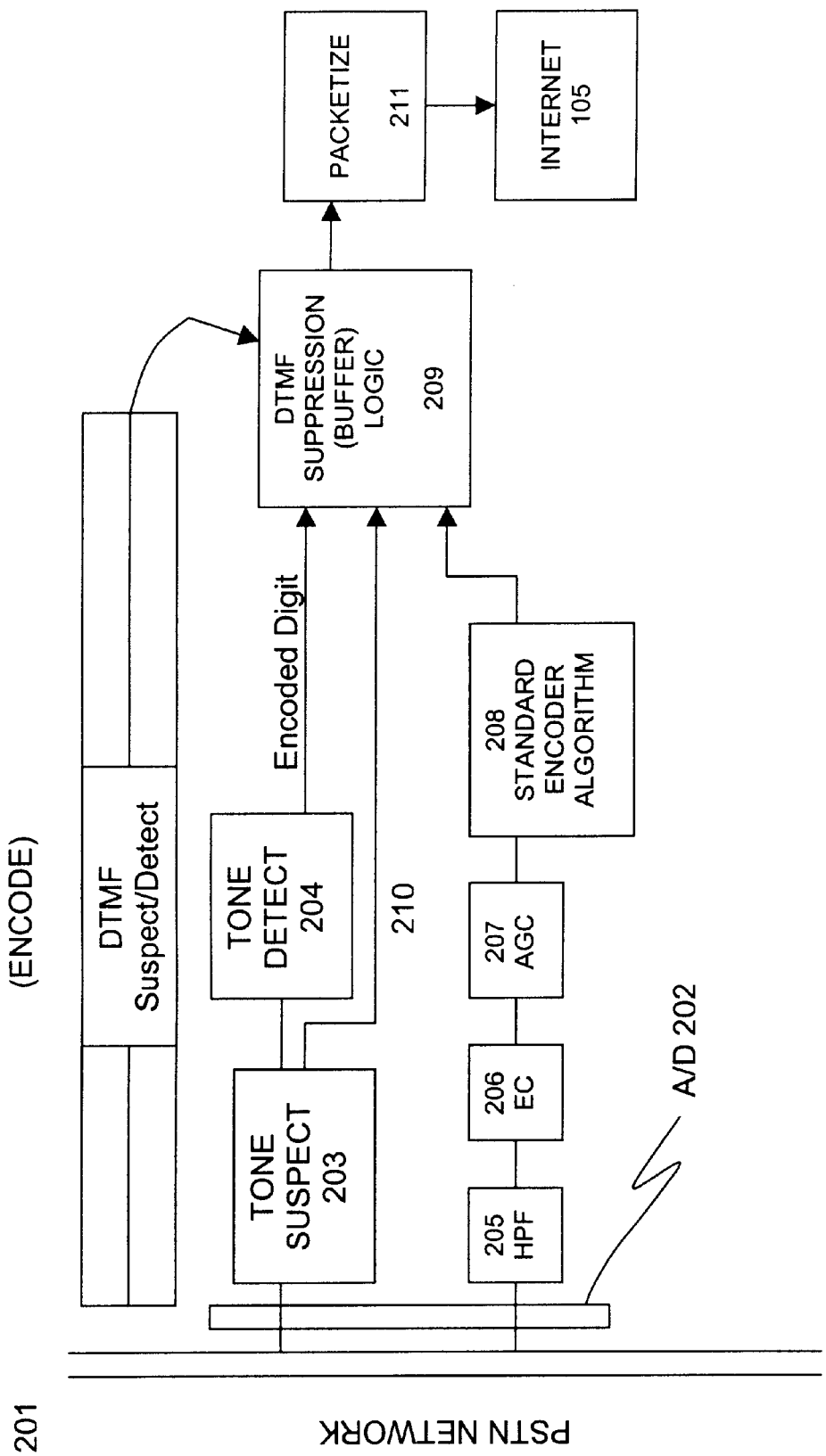
FIG. 2 shows a slightly more detailed diagram of the encoding mechanisms used to process the audio signal being input from a transmitting telephone apparatus.

FIG. 2 shows a slightly more detailed diagram of the functionality of the gateway required in order to suppress DTMF tones. The arrangement of FIG. 2 includes the standard encoding and compression algorithms, as well as logic to suppress tones.

In operation, analog voice signals arrive from the public switched telephone network 201 and are converted to digital signals by analog to digital (A/D) converter 202. The branch of processing comprising tone suspect and tone detection runs in parallel with the lower branch which comprises standard audio processing functions.

The digital audio signal is preconditioned by hi-pass filter 205, echo canceller 206, and automatic gain control algorithm 207. The pre-processed audio signal is then encoding using the standard algorithm 208 and the encoded audio signal is then transmitted to DTMF suppressor 209.

In parallel with the foregoing, tone suspect algorithm 203 operates on sequential 10 millisecond frames of digitized audio. After the 10 milliseconds, tone suspect algorithm 203 will either suspect a tone or will indicate that a tone is not present in the audio stream. If a tone is suspected, that tone is confirmed within two frames by the tone detection algorithm 204, which outputs the specific encoded digit in digital form. There is however, a two frames worth of delay between the time that the tone is suspected and the time it is actually confirmed and its value ascertained. The digitally encoded digit is transmitted online 210 to DTMF suppress logic 209.

Typically, it takes 10 milliseconds for the digital audio to propagate through the tone suspect algorithm 203, and approximately 20 milliseconds to propagate through the tone detection algorithm 204. Accordingly, there is approximately a 30 millisecond delay which is required in order to confirm and encode a DTMF digit.

If tone suspect algorithm 203 suspects a tone in the first 10 milliseconds, it will immediately cause DTMF suppression buffer 209 to begin buffering information. If the first 10 milliseconds was actually a false alarm, then a "kill" signal will be generated by the tones suspect algorithm at the end of another 10 milliseconds. Upon the generation of such a "kill" signal, the buffering at suppression buffer 209 will cease, and the data will begin being read out, packetized at block 211 and transmitted over the Internet 105. If however, the existence oftone is confirmed, then within 30 milliseconds of the beginning of the tone the encoded digit and confirmation signal will arrive at suppression buffer 209 via line 210. This will cause the several frames of tone to be deleted from the audio signal and a digital signal representing the tone to be transmitted instead.

It can be appreciated that the suppression buffer begins filling up and delaying the transmission of audio data only during the time that such audio data is suspected to be toned. If such audio data is in fact toned, then it is deleted. If such audio data is not tone, the audio data is then transmitted using the standard IP protocols for voice over the internet.

It is also noted that the tone detection is done at the transmitting gateway. After such tone detection is done, the tone is transmitted as a digital signal over the internet, regenerated at the receiving gateway.

The FFT can also be installed to receive the LPC coefficients from the voice coder, rather than the raw digital data as shown. This permits a short (e.g., 10 sample) FFT to determine the tone, rather than a lengthier FFT that would otherwise be required.

The above describes the preferred embodiment of the invention, however, it will be apparent to those of skill in the art that various other modification or additions will be apparent. Such modifications or additions will be apparent to those of skill in the art, and are intented to be covered by the following claims.

What is claimed is:

1. Apparatus for transmitting telephone calls over a data network using a packet switching protocol, said apparatus comprising:

a telephone;

a transmitting gateway and a receiving gateway, each of said transmitting and receiving gateways being connected to the data network, said transmitting gateway including audio processing means for conducting telephone calls with said telephone, digitizing and packetizing audio signals received from said telephone, and transmitting the digitized packetized audio signals over the data network to the receiving gateway, said receiving gateway being arranged to convert digitized packetized audio signals to analog audio signals for transmission to a voice processing system;

means included at said transmitting gateway to monitor said audio signals received from said telephone and to determine whether said audio signals are suspected of having a control tone therein;

means responsive to said means to monitor and to determine for delaying transmission of any portion of said received audio signal if said means to monitor and to determine indicate that said portion is suspected of being a control tone;

means responsive to said means for delaying for verifying, based upon additional portions of said received audio signal, whether said portion and said additional portions are verified to contain a control tone; and means responsive to said means for verifying for (i) discarding all portions containing said control tone and sending over said data network a digital signal indicative of said tone and its value if said tone is verified and for (ii) sending said portions as packetized audio data if said tone is not verified after being suspected.

2. Apparatus of claim 1 wherein said means to monitor and to determine monitors and determines in less times than said audio processing means processes said audio signal.

3. Apparatus of claim 1 wherein said means for verifying includes means for generating a digital value indicative of said tone.

4. A method of transmitting a telephone call over a worldwide data network including the steps of receiving and digitizing an audio signal, said audio signal including control tones, and processing the audio signal with two parallel paths, a first path comprising a tone suspect algorithm and a tone confirmation algorithm, and a second path comprising audio processing and packetizing functions, the transmission of audio signals out of the first path onto the data network being selectively delayed by the tone suspect algorithm and being selectively deleted entirely by the tone confirmation algorithm, the tone confirmation algorithm substituting a digital signal indicative of a control tone confirmed each time it selectively deletes entirely the transmission of audio signals.

5. The method of claim 4 wherein said first path is divided into portions including a high pass filter, and echo cancellor, and automatic gain control algorithm, and an encoder.

6. The method of claim 5 wherein said filter, said echo cancellor, said automatic gain control algorithm, and said encoder takes as least as long to operate on a portion of the audio signal as the tone suspect algorithm takes to operate on the same portion thereof.

7. The method of claim 6 wherein said digital signal indicative of said control tone is converted back into a control tone after traversing the network.

* * * * *